United States Patent [19]

Tanaka

[11] Patent Number: 4,511,212

[45] Date of Patent: Apr. 16, 1985

[54] FOCUSSING LENS OPERATING DEVICE

[75] Inventor: Yoshiharu Tanaka, Omiya, Japan

[73] Assignee: Mansei Kogyo Kabushiki Kaisha, Kawaguchi, Japan

[21] Appl. No.: 416,588

[22] Filed: Sep. 10, 1982

[30] Foreign Application Priority Data

Sep. 22, 1981 [JP] Japan .............................. 56-141748[U]

[51] Int. Cl.³ ................................................. G02B 7/11
[52] U.S. Cl. ..................................................... 350/255
[58] Field of Search ............................ 350/255; 369/45

[56] References Cited

U.S. PATENT DOCUMENTS 4,280,215 7/1981 Okano .................................... 369/45
4,437,177 3/1984 Watabe et al. ......................... 369/45

FOREIGN PATENT DOCUMENTS 2025280 12/1971 Fed. Rep. of Germany ...... 250/255
2207107 8/1973 Fed. Rep. of Germany ...... 250/255
1476583 6/1977 United Kingdom .
1503162 3/1978 United Kingdom .

Primary Examiner—William H. Punter
Attorney, Agent, or Firm—Oblon, Fisher, Spivak, McClelland & Maier

[57] ABSTRACT

An optical focussing device for an optical information storage system. A hollow cylindrical holder carries a lens at its upper end. The holder is connected to a frame by two thin plates adjacent each other near the upper end and by one thin plate at a lower position. A vibration diminution element is interposed between the upper pair of plates. Each plate is circular with a central opening and several scroll shaped cuts extending from the opening toward the outside edge.

16 Claims, 3 Drawing Figures

FOCUSSING LENS OPERATING DEVICE

The present invention relates to an apparatus for optically reproducing information such as video and/or audio signals recorded on a dis-shaped information carrier, and more particularly to a means for supporting a focussing unit for such apparatus to be accurately moved in vertical direction to the plane of the information carrier for focussing control.

In the conventional optical information reproducing apparatus, the focussing control to keep the beam spot constant on the plane of the information carrier is effected by moving the focussing unit including a focussing lens in the vertical direction to the plane of the information carrier by way of an electro-magnetic controlling means. In such apparatus, the focussing unit is supported in resilient suspension relative to a frame by means of a single elastic plate arranged around the focussing unit. However, since the elastic plate used for suspension of the focussing unit is made of a very thin plate and the focussing unit is elastically supported on the frame by such single thin plate only, in the prior art reproducing apparatus, there is a defect that the focussing unit moves accidentally in the lateral or slantwise direction while it is moved in upward and downward directions in relation to the plane of the information carrier for the focussing control. Due to this defect, in the conventional optical information reproducing apparatus, the focussing of the light beam on the information carrier is sometimes made erroneously and in consequence, the information recorded on the information carrier is not correctly obtained.

It is therefore an object of the present invention to provide a simple means for supporting the focussing unit to be reliably moved in the vertical direction to the surface of the information carrier. Other objects, advantages, and features of the invention will be apparent from the following detailed description of the preferred embodiments thereof when read in connection with the attached drawings, in which.

Figure 1:
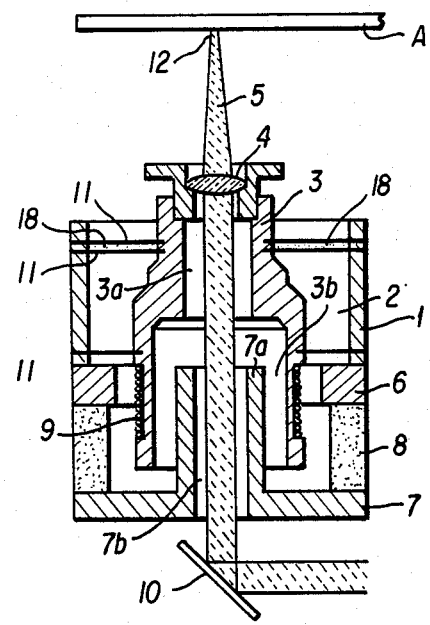
FIG. 1 is a longitudinal sectional view of the focussing unit operating device using a focussing unit supporting means according to the invention.

FIG. 1 shows the first embodiment of a focussing unit operating device in which a focussing unit is moved only in one direction for the focussing control purposes. Tracking control in this embodiment is performed by a pivotable deflecting mirror and for such purposes, the focussing unit is not moved. With reference to FIG. 1, designated by the reference numeral (1) is a frame. This frame (1) is made of single block of for example metal and formed with a comparatively large through bore (2) which extends vertically. Within the frame (1), there is arranged a cylindrical holder (3). The cylindrical holder (3) is provided on its upper half part with an axial through bore (3a) whose lower end communicates with a wider axial through bore (3b) formed on the lower half part of the cylindrical holder (3). The upper portion of the cylindrical holder (3) mounts a focussing lens (4). This focussing lens (4) is adapted to bring a light beam (5) from a beam generating means (not shown) into focus on the plane of a disc-shaped information carrier (A) to read the information recorded on it. The cylinrical holder (3) is resiliently suspended within the through bore (2) of the frame (1) by means of thin plates which will be explained later in detail. At the bottom of the frame (1), an electro-magnetic controlling means is disposed to operate the focussing lens (4) in upward and downward directions in relation to the plan of the information carrier (A) for the purpose of the focussing control of the light beam (5). The electro-magnetic controlling means is constituted by a first and second magnetic yokes (6,7), a circular magnet (8) interposed between the magnetic yokes (6,7) and a coil (9) which is wound around the outer surface of the lower portion of the cylindrical holder (3). The magnetic yoke (7) has a center projection (7a) extending into the lower axial through bore (3b) of the cylindrical holder (3). This center projection (7a) of the magnetic yoke (7) is formed with an axial passage (7b) arranged in vertical alignment with the axial through bores (3a,3b) of the cylindrical holder (3). Below the axial passage (7b) of the magnetic yoke (7), a deflecting mirror (10) is disposed in vertical alignment with the focussing lens (4). This deflecting mirror (10) is rotatable for the purpose of tracking control of the light beam (5).

Figure 2:
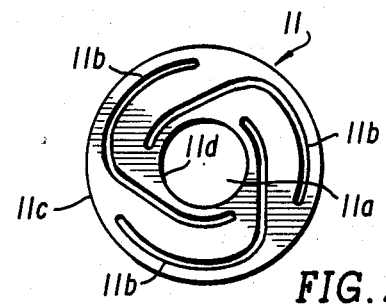
FIG. 2 is a longitudinal sectional view of the second embodiment of the focussing unit operating device using the same focussing unit supporting means of FIG. 1.

Hereinafter, the above-mentioned thin plates which form a support for elastically maintaining the cylindrical holder (3) on the frame (1) will be explained in detail. As shown in FIG. 1, the support of the present invention is constituted by three thin plates (11) arranged around the cylindrical holder (3) in parallel spaced relationship with each other. The three thin plates (11) include two upper thin plates (11) arranged on the upper portion of the cylindrical holder (3) on which the focussing lens (4) is mounted and one lower thin plate (11) arranged around the lower portion of the cylindrical holder (3). The two upper thin plates (11) are arranged adjacent to each other to leave a small space therebetween in which an element which has certain vibration diminution chracteristics is interposed. However, they can be arranged in contact relation with each other. The three thin plates (11) are made of a thin metal plate. In this embodiment, this thin metal plate is made of stainless steel and produced by way of a stamping or etching process. This thin metal plate can also be made of phosphor bronze. As shown in FIG. 2, each thin plate (11) has a circular shape and is formed with a center opening (11a) therein. There is further provided three narrow cuts (11b) in the form of scroll spreading outwards from around the center opening (11a), so that it has an adequete elasticity to support the cylindrical holder (3) for focussing control as well as an adequete strength against the lateral movement given from the outside, etc. The three thin plates (11) having such structure are fixedly attached to the inner wall of the frame (1) with their outer periphery (11c) and to the cylindrical holder (3) with their inner periphery (11d) thereby supporting the cylindrical holder (3) on the frame (1) in resilient suspension. The cylindrical holder (3) supported by the three thin plates (11) in this manner is moved, when the electro-magnetic controlling means is operated, in the upward and downward directions in relation to the information carrier (A) through the elastic action of those thin plates (11) to correctly focuss the light beam (5) on the information carrier (A).

In the optical system of this embodiment, the light beam (5) emerged from the beam generating means (not shown) is deflected in the vertical (upward) direction by the pivotable deflecting mirror (10) and is entered into the axial passage (7b) of the magnetic yoke (7). Then, the light beam (5) travels through the axial through bores (3a,3b) of the cylindrical holder (3) and is converged into a minute spot (12) on the surface of the information carrier (A) through the focussing lens (4). In this embodiment, the cylindrical holder (3) is moved by the electro-magnetic controlling means in the upward and downward directions in relation to the plane of the information carrier (A) for the focussing control of the light beam (5) when the light beam (5) is out of focus on the information carrier (A) due to for example the change of the distance between the focussing lens (4) and the plane of the information carrier (A). However, in this embodiment the tracking control to correctly project the beam spot (12) in desired incident relation upon a track to be read (not shown) on the information carrier (A) is effected by deflecting the light beam (5) in minute angles through rotation of the reflecting mirror (10). In this manner, in this embodiment, the cylindrical holder (3) is moved for the focussing control only therefore its lateral or slantwise movements occur on that particular occasion. In order that the focussing control of the light beam (5) is correctly performed, the cylindrical holder (3) having the focussing lens (4) on its upper portion must be accurately moved in the vertical direction to the plane of the information carrier (A) and its lateral or slantwise movements during such vertical displacement must be prevented. The lateral or slantwise movements of the cylindrical holder (3) are caused by the portional differences of the thickness thereof made in the production process. In the present invention, such lateral or slantwise movements of the cylindrical holder (3) which affect a bad influence on the correct focussing control are eliminated by assuredly supporting it on the frame (1) by means of the three thin plates (11), particularly by means of the two upper adjacent thin plates (11) arranged on the upper portion of the cylindrical holder (3). By the support of those three thin plates (11), the cylindrical holder (3) is maintained relative to the frame (1) in the assured manner and in consequence, it can move accurately in the vertical direction to the plane of information carrier (A) without any lateral or slantwise movements thereof.

Further, in the present invention, owing to the combination of those three thin plates (11), if any of the thin plates (11) is vibrated laterally due to for example a shock given from the outside, such lateral vibration can be diminished to such degree as not affect a bad influence upon the accurate vertical motion of the cylindrical holder (3). Furthermore, as described above, since the two upper thin plates (11) are arranged in adjacency of each other, they rub against each other in the course of the upward and downward diaplacement of the cylindrical holder (3). By such friction between the two upper thin plates (11), the lateral vibration of each thin plate is further diminished. To make such lateral vibration of the thin plates much smaller, an element (18) which has certain vibration diminution characteristics can be arranged between the two upper thin plates (11) as explained before. In the preferred embodiment, a gelatinous silicon grease or Butyl rubber is used as such element and interposed between these two upper thin plates (11). Of course, other element which has the same vibration diminution characteristics may be used in the present invention. As a result of the assured support by the three thin plates (11) and the elimination of the lateral vibration of the thin plates, the vertical motion of the cylindrical holder (3) is carried out in the reliable manner.

Figure 3:
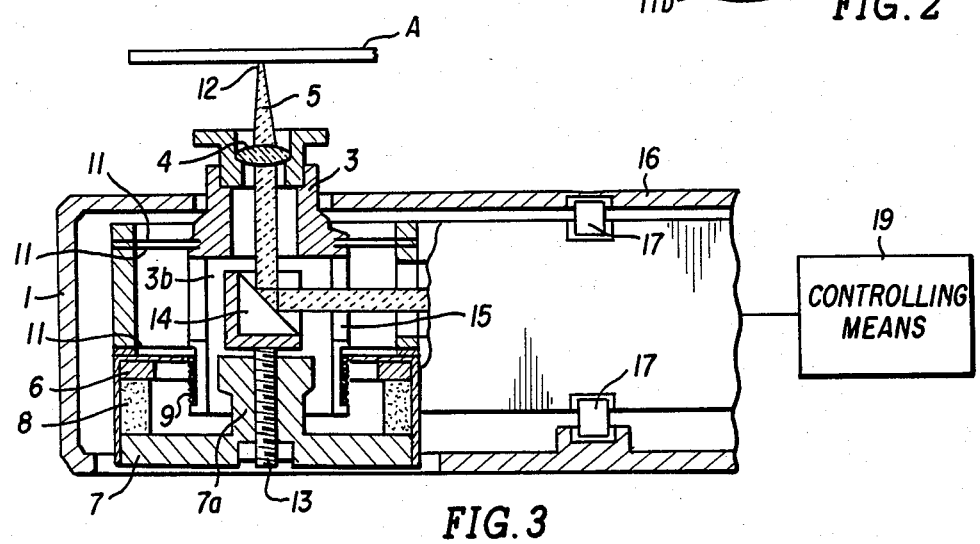
FIG. 3 is a top plan view of one embodiment of the diaphragm used in the focussing unit supporting means according to the invention.

FIG. 3 shows the second embodiment of the focussing unit operating device in which the focussing unit is moved in two different directions for the purpose of the tracking control as well as for the focussing control. In FIG. 3, like elements shown in FIG. 1 are given like reference numerals, the cylindrical holder (3) having the focussing lens (4) on the upper portion thereof is held in resilient suspension within the frame (1) by the three thin plates (11). The structure of the thin plates (11) and the support of the cylindrical holder (3) by such thin plates (11) are the same with the first embodiment. The electro-magnetic controlling means including the first and second magnetic yoke (6,7), circular magnet (8) and coil (9) is disposed under the cylindrical holder (3) to operate it for the focussing control. A screw (13) is inserted into the center projection of the magnetic yoke (7) whose upper end is extended into the lower axial through bore (3b) of the cylindrical holder (3). A deflecting mirror (14) is disposed within the lower axial through bore (3b) of the cylindrical holder (3) and is fixed at the top of the screw (13) at an angle of 45° in vertical alignment with the focussing lens (4). The cylindrical holder (3) is formed with a cutout (15) on the lateral side in horizontal alignment with the deflecting mirror (14) to lead the light beam (5) from the beam generating means (not shown) toward the deflecting mirror (14). The light beam (5) incident upon the deflecting mirror (14) is deflected in the vertical (upward) direction by it and is converged into the beam spot (12) on the surface of the information carrier (A). A framing unit including the frame (1) is disposed and movably supported in an outer case (16). The framing unit is held in suspension within the outer case (16) by means of upper and lower rubber pins (17) inserted into the framing unit and the outer case (16).

In this embodiment, the cylindrical holder (3) is moved by the electro-magnetic controlling means in the vertical direction to the plan of the information carrier (A) for the focussing control of the light beam (5) in the same manner with the first embodiment. Further, in this embodiment, for the tracking control purposes, the framing unit including the frame (1) is displaced horizontally in parallel relationship with the plane of the information carrier (A) by way of another electro-magnetic controlling means (19). At this time, since the cylindrical holder (3) is supported on the frame (1) through the three thin plates (11), it moves horizontally in parallel with the plane of the information carrier (A) together with the framing unit. By such horizontal displacement of the framing unit for the purpose of the tracking control, there occurs far larger lateral or slantwise movements of the cylindrical support (3) which affect much worse influence upon the vertical motion of the cylindrical holder (3). As a result, undesirable movement of the cylindrical holder (3) for the focussing control, namely its lateral or slantwise movements, is taken place by reaonance with the horizontal displacement of the framing unit for the tracking control. In this embodiment, however, the cylindrical holder (3) is supported on the frame (1) in the assured manner by means of the three thin plates (11) as explained before in connection with the first embodiment. Such assured support by the three thin plates (11) is much more useful for the prevention of the lateral or slantwise movements of the cylindrical holder (3) on such occasion of the horizontal displacement of the framing unit for the tracking control. As a result, undesirable movement of the cylindrical holder (3) for the focussing control is prevented. This assured support of the cylindrical holder (3) by the three thin plates (11) is also helpful in performing accurate tracking control.

Further, as mentioned before in connection with the FIG. 3, the thin plates (11) are made in the particular patterns to provide a strength against the lateral movement which also helps to prevent the lateral or slantwise movement of the cylindrical holder (3) in the course of the tracking control. In consequence, in this embodiment, both the tracking control and focussing control are carried out in good condition and therefore the information on the information carrier (A) is correctly obtained. In this embodiment, the lateral vibration is also diminished in like manner with the first embodiment.

As mentioned so far, in the present invention, owing to the support of the cylindrical holder (3) relative to the frame (1) by means of the three thin plates (11), in particular by the two upper adjacent thin plates (11), the lateral or slantwise movements of the cylindrical holder (3) is prevented not only in such case that the cylindrical holder (3) is moved in the vertical direction for the focussing control but also in such case that it is moved in both vertical and horizontal directions for the focussing and tracking controls.

What is claimed is:

1. A focussing lens operating device for use in an apparatus for reading video and/or audio information recorded in an optionally readable structure on a disc-shaped information carrier comprising:
   a frame;
   a cylindrical hollow holder held in resilient suspension on said frame;
   a focusing lens disposed in the upper portion of said cylindrical hollow holder to converge a light beam into a beam spot on the surface of the information carrier;
   an electro-magnetic controlling means arranged near the lower end of said cylindrical hollow holder to move said cylindrical hollow holder upwardly and downwardly in relation to the surface of the information carrier so as to control the size of the beam spot formed on the surface of the information carrier through said focussing lens; and
   upper and lower supporting means arranged around said cylindrical hollow holder in parallel spaced relationship with each other to support said cylindrical hollow holder in resilient suspension on said frame, wherein said upper supporting means is constituted by two thin plates arranged around said upper portion of said cylindrical hollow holder, said thin plates being adjacent each other so as to reduce lateral vibrations of said plates by friction between said plates when said holder is displaced for focusing control.

2. A focussing lens operating device as set forth in claim 1, wherein said lower supporting means is constituted by one thin plate arranged on the lower portion of said cylindrical hollow holder.

3. A focussing lens operating device as set forth in claim 2, wherein said frame is formed with a vertical bore within which said cylindrical hollow holder is held in resilient suspension on said frame by said three thin plates.

4. A focussing lens operating device as set forth in claim 3, wherein said three thin plates are made of a thin metal plate having a center opening therein within which said cylindrical hollow holder is being inserted, wherein the outer and inner peripheries of said thin plates are fixedly attached to said frame and said cylindrical hollow holder, respectively.

5. A focussing lens operating device as set forth in claim 4, wherein each of said three thin plates has a circular shape and is formed with three narrow cuts in the form of scroll spreading outwards from said center opening thereof to provide an adequate elasticity as well as an adequate strength against lateral force for said thin plate.

6. A focussing lens operating device as set forth in claim 5, wherein said each thin plate is made of a stainless steel plate and produced by way of a stamping or etching process.

7. A focussing lens operating device as set forth in claim 5, wherein said thin plate is made of a phosphor bronze plate.

8. A focusing lens operating device as set forth in claim 3, wherein said two upper thin plates are arranged around said cylindrical hollow holder in contact relation with each other.

9. A focussing lens operating device as set forth in claim 1, wherein said electroc-magnetic controlling means comprises a first and second magnetic yokes, a magnet interposed between said yokes and a coil which is wound around the outer surface of the lower portion of said cylindrical hollow holder.

10. A focussing lens operating device as set forth in claim 9, including a deflecting mirror arranged under said electro-magnetic controlling means which is pivotable and is adapted to deflect the light beam in minute angles through rotation thereof.

11. A focussing lens operating device as set forth in claim 3, wherein there is arranged an outer case within which said frame is movably supported on said outer case by mean of upper and lower rubber pins inserted into the holes of said outer case and said frame, and wherein said frame is moved horizontally in parallel relation with the surface of said information carrier by way of another electro-magnetic controlling means.

12. A focussing lens operating device as set forth in claim 11, including a deflecting mirror arranged within said cylindrical hollow holder, wherein said deflecting mirror is fixed at the top of a screw inserted into said second magnetic yoke at an angle of 45° in vertical alignment with said focussing lens.

13. A focussing lens operating device as set forth in claim 11, wherein said cylindrical hollow holder is formed with a cutout on the lateral side in front of said deflecting mirror.

14. A focussing lens operating device for use in an apparatus for reading video and/or audio information recorded in an optically readable structure on a disc-shaped information carrier comprising:
   a frame;
   a cylindrical hollow holder held in resilient suspension on said frame;
   a focussing lens disposed in the upper portion of said cylindrical hollow holder to converge a light beam into a beam spot on the surface of the information carrier;
   an electro-magnetic controlling means arranged near the lower end of said cylindrical hollow holder to move said cylindrical hollow holder upwardly and downwardly in relation to the surface of the information carrier so as to control the size of the beam spot formed on the surface of the information carrier through said focussing lens; and upper and lower supporting means arranged around said cylindrical hollow holder in parallel spaced relationship with each other to support said cylindrical hollow holder in resilient suspension on said frame, wherein said upper supporting means is constituted by two thin plates arranged around said upper portion of said cylindrical hollow holder, said two thin plates being adjacent each other with a vibration diminution element interposed therebetween to diminish lateral vibration of said plates.

15. A focussing lens operating device as set forth in claim 14, wherein said vibration diminution element is made from a gelatinous silicon grease.

16. A focussing lens operating device as set forth in claim 15, wherein said element is made from a Butyl rubber.

* * * * *